United States Patent
Teglia

(10) Patent No.: US 9,544,130 B2
(45) Date of Patent: Jan. 10, 2017

(54) PROTECTION OF A CALCULATION AGAINST SIDE-CHANNEL ATTACKS

(71) Applicant: STMicroelectronics (Rousset) SAS, Rousset (FR)

(72) Inventor: Yannick Teglia, Belcodene (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 49 days.

(21) Appl. No.: 14/470,861

(22) Filed: Aug. 27, 2014

(65) Prior Publication Data

US 2015/0063561 A1 Mar. 5, 2015

(30) Foreign Application Priority Data

Aug. 29, 2013 (FR) ...................... 13 58271

(51) Int. Cl.
*H04L 9/00* (2006.01)
*H04L 9/08* (2006.01)

(52) U.S. Cl.
CPC .............. *H04L 9/002* (2013.01); *H04L 9/003* (2013.01); *H04L 9/0869* (2013.01)

(58) Field of Classification Search
CPC ......... H04L 9/002; H04L 9/003; H04L 9/0869
See application file for complete search history.

(56) References Cited

U.S. PATENT DOCUMENTS

| 4,471,164 A | 9/1984 | Henry |
| 7,787,620 B2* | 8/2010 | Kocher ................. G06F 21/556 380/1 |
| 2005/0152541 A1* | 7/2005 | Takenaka ............... G06F 7/725 380/28 |
| 2007/0177721 A1* | 8/2007 | Itoh ........................ G06F 7/723 380/28 |
| 2009/0092245 A1* | 4/2009 | Fumaroli ............... G06F 7/723 380/28 |
| 2013/0016827 A1 | 1/2013 | Teglia |
| 2014/0016772 A1 | 1/2014 | Yajima et al. |

OTHER PUBLICATIONS

Moreno, C. et al., "SPA-resistant binary exponentiation with optimal execution time," J Cryptogr Eng (1):87-99, 2011.

* cited by examiner

*Primary Examiner* — Jung Kim
*Assistant Examiner* — Thomas Ho
(74) *Attorney, Agent, or Firm* — Seed IP Law Group LLP

(57) ABSTRACT

A method for protecting a ciphering algorithm executing looped operations on bits of a first quantity and on a first variable initialized by a second quantity, wherein, for each bit of the first quantity, a random number is added to the state of this bit to update a second variable maintained between two thresholds.

27 Claims, 3 Drawing Sheets

PROTECTION OF A CALCULATION AGAINST SIDE-CHANNEL ATTACKS

CROSS REFERENCE TO RELATED APPLICATIONS

This application claims the priority benefit of French Patent Application number 13/58271, filed on Aug. 29, 2013, which is hereby incorporated by reference to the maximum extent allowable by law.

BACKGROUND

Technical Field

The present disclosure generally relates to electronic circuits and, more specifically, to circuits performing ciphering calculations. The present disclosure more specifically relates to the protection of a calculation executed by an electronic circuit against side-channel attacks.

Discussion of the Related Art

Many techniques for protecting a ciphering calculation against side-channel attacks are known. Such techniques typically use one or several random numbers for masking quantities manipulated by the calculation.

Be they calculations based on elliptic curves, using add and double operations, or modular exponentiation calculations based on a so-called square multiplication technique, a difficulty is to eliminate the disturbance introduced by the random number to restore the result.

SUMMARY

An embodiment of the present disclosure provides a technique for protecting a calculation executed by an electronic circuit which overcomes all or part of the disadvantages of usual solutions.

Another embodiment provides a technique compatible with double-and-add operations on elliptic curves or square-and-multiply operations for modular exponentiation calculations.

Another embodiment is more specifically adapted to side-channel attacks.

An embodiment provides a method for protecting a ciphering algorithm executing looped operations on bits of a first quantity and on a first variable initialized by a second quantity, wherein, for each bit of the first quantity, a random number is added to the state of this bit to update a second variable maintained between two thresholds.

According to an embodiment, for each bit of the first quantity, the second variable is updated with:

its value plus the random number and minus the state of the bit if the result of this calculation ranges between said two thresholds; or the random number minus the state of the concerned bit in the opposite case.

According to an embodiment, said second variable is used in one of the operations performed for each bit of the first quantity.

According to an embodiment, for each bit of the first quantity, the first variable is updated with:

the result of a calculation taking into account the second quantity and the random number if the second variable, plus the random number and minus the state of the concerned bit, ranges between said two thresholds; or the result of a calculation further taking into account said second variable in the opposite case.

According to an embodiment, said calculation comprises a sum and a product.

According to an embodiment, said calculation comprises a product and an exponentiation.

According to an embodiment, the random number is drawn for each bit of the first quantity.

According to an embodiment, at the end of a calculation, the first variable is updated by a calculation taking into account said second variable and said second quantity.

According to an embodiment, the second variable is at most over 8 bits.

According to an embodiment, said operations comprise an addition and a doubling, said second variable being taken into account during the addition step.

According to an embodiment, the method is applied to a multiplication of a point of an elliptic curve by a scalar number, said scalar number representing the first quantity and said point representing the second quantity.

According to an embodiment, said operations comprise a squaring and a multiplication, said second variable being taken into account in the multiplication step.

According to an embodiment, the method is applied to a modular exponentiation of the second quantity, the first quantity representing the exponent.

An embodiment also provides an electronic circuit capable of implementing the method.

The foregoing and other features and advantages will be discussed in detail in the following non-limiting description of specific embodiments in connection with the accompanying drawings.

DETAILED DESCRIPTION

Figure 1:
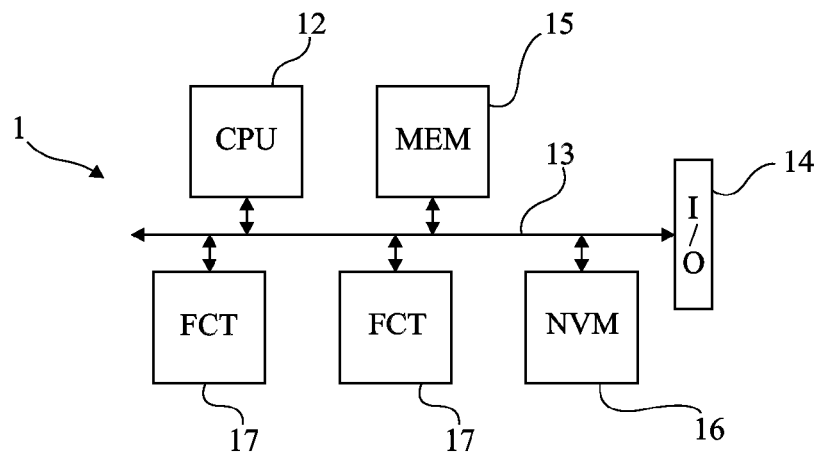
FIG. 1 is a very simplified representation in the form of blocks of an example of electronic circuit of the type to which the embodiments which will be described apply.

The same elements have been designated with the same reference numerals in the different drawings. For clarity, only those steps and elements which are useful to the understanding of the embodiments which will be described have been illustrated and will be detailed. In particular, the nature of the quantities manipulated by the different calculations have not been detailed, the described embodiments being compatible with usual natures of such numbers. Further, the origin of the numbers to be submitted to the calculations which will be described, as well as the destination of the results, more specifically in ciphering applications, has not been detailed either, the described embodiments being here again compatible with the usual origins and destinations of such numbers.

FIG. 1 very schematically shows, in the form of blocks, an example of an electronic circuit 1 of the type to which the embodiments which will be described apply. Such a circuit aims at encryption applications and generally comprises a processing unit 12 (CPU) capable of communicating, over one or several address, data, and control buses 13 with different elements, among which at least one input/output element 14 (I/O), for communicating with the outside of circuit 1, one or several volatile memory circuits 15 (MEM), one or several non-volatile memory circuits 16 (NVM), and one or several functions symbolized by blocks 17 (FCT) depending on the application of the circuit. Although reference has been made hereabove to an electronic circuit, it should be understood that the embodiments which will be described apply to a hardware implementation by a state machine in wired logic or to a software implementation having instructions executed by processing unit 12.

In ciphering applications, calculations are generally performed over numbers of significant size (from a few hundreds to a few thousands of bits) and the most current ciphering algorithms to which the present description relates comprise either a modular exponentiation (typically, the RSA algorithm), or a multiplication of a point of an elliptic curve by a scalar number. The exponent in the case of the modular exponentiation or the scalar number in the case of the multiplication on an elliptic curve generally forms a so-called secret quantity which should not be made accessible to non-authorized circuits or users.

To protect the secret quantities against side-channel attacks in ciphering calculations, random numbers are generally used.

Figure 2:
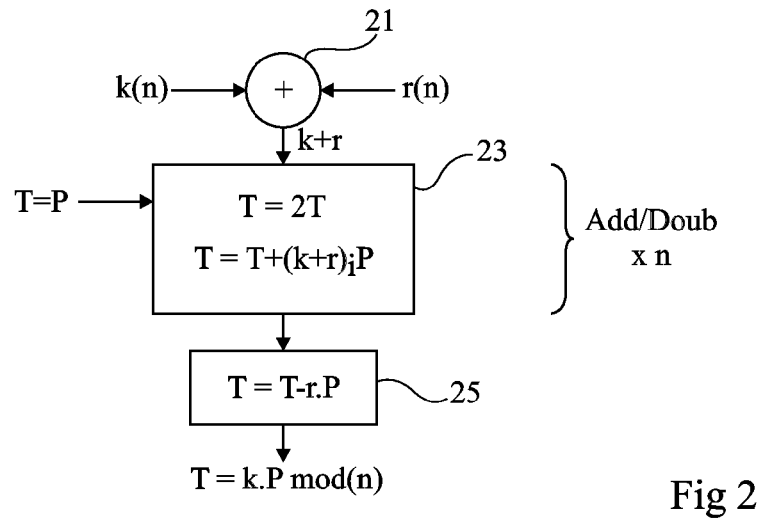
FIG. 2 illustrates an example of usual protection of a multiplication on an elliptic curve.

FIG. 2 schematically shows a usual example of protection by a random number of a multiplication of a point P of an elliptic curve by a scalar number k. In the example of FIG. 2, it is assumed that the calculations are performed modulo an integer n which represents the size of the manipulated numbers.

It is started by calculating (block 21, +) the sum of number k generally representing the secret quantity with a random number r. The size of the random number generally corresponds to at least that of key k since the size of this number conditions the security, that is, the number of masked bits. In the example of FIG. 2, quantities k and r over n bits are assumed.

The obtained number k+r is then used in a so-called calculation of addition/doubling (Add/Doub) of a quantity P which is desired to be ciphered. Quantity P represents a point of an elliptic curve. A calculation variable T is initialized with the value of point P. Then, for each bit $(k+r)_i$ of number k+r, the content of variable T is doubled (bloc 23, T=2T) after which, for the bits $(k+r)_i$ of number k+r of value 1, point P is added to variable T ($T=T+(k+r)_i \cdot P$).

Once all the bits of number k+r have been processed, the contribution of random number r is eliminated by performing a last operation (bloc 25, $T=T-r \cdot P$) of subtraction of quantity r·P to the intermediate result. Variable T then contains result k·P mod(n).

Most often, to protect the calculation against so-called horizontal attacks, typically single power analysis attacks (SPA), the same number of calculation steps is carried out whatever the state of the bit of number k+r. This generally results in using an additional variable which does not take part in the final result.

The protection implemented by the algorithm described in relation with FIG. 2 imposes, to unmask the calculated quantity at the end of the calculation, performing an additional multiplication by a scalar number (product r·P) to be able to subtract it from the obtained result.

Figure 3:
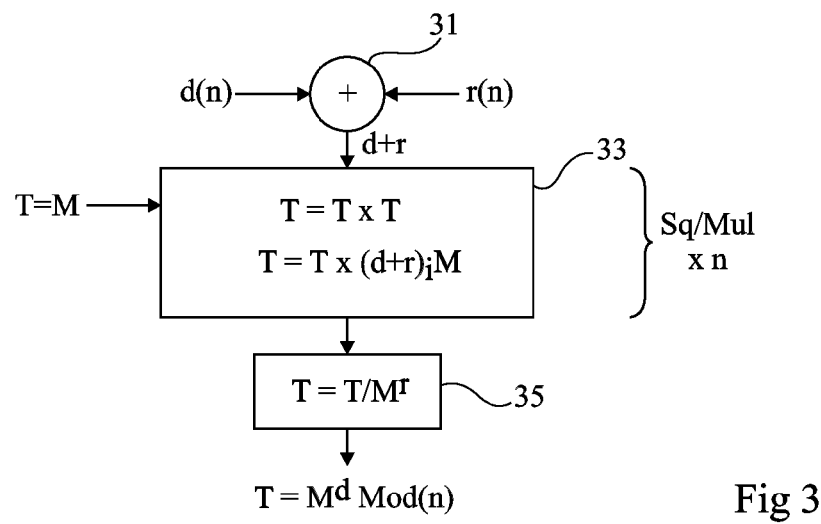
FIG. 3 illustrates an example of usual protection of a modular exponentiation.

FIG. 3 illustrates a usual example of modular exponentiation calculation implementing a random number r to mask calculations exploiting a secret quantity d.

As in the previous case, it is started (block 31) by adding quantity d, which represent the exponent of the modular exponentiation, to a random number r, to obtain a value d+r. Here again, the number (for example, n) of bits of random number r corresponds at least to the number of bits of value d to obtain an efficient protection.

For each bit (d+r)i of number d+r, a so-called square-and-multiply operation is then performed. A variable T is initialized by message M to be submitted to the modular exponentiation. Then, the content of variable T is multiplied by itself (squaring). Then, for all the bits $(d+r)_i$ of value d+r of value 1, variable T is updated by multiplying its content by message M.

Once all the bits of the exponent have been processed, the contribution of the random number is eliminated by performing an operation (block 35, $T=T/M^r$) where intermediate result T is divided by value M exponent r. One then obtains, in variable T, result $M^d$ mod(n).

As in the case of FIG. 2, when the bits of the exponent (value d+r) are at zero, an operation which is not useful for the calculation is generally performed to protect it against SPA-type attacks.

As for a double-and-add calculation, the introduction of a random number of the size of the quantity to be protected generates, at the end of an operation, a resource-intensive calculation (intensive in terms of time or circuit capacity).

According to an embodiment, it is provided to take advantage of the fact that the calculations are performed in a loop for the different bits of the quantity to be protected to maintain the drift introduced by the random number within a range smaller than the number of bits of the quantity to be protected. More specifically, it is provided to define a window (in number of bits) where the drift is limited.

Figure 4:
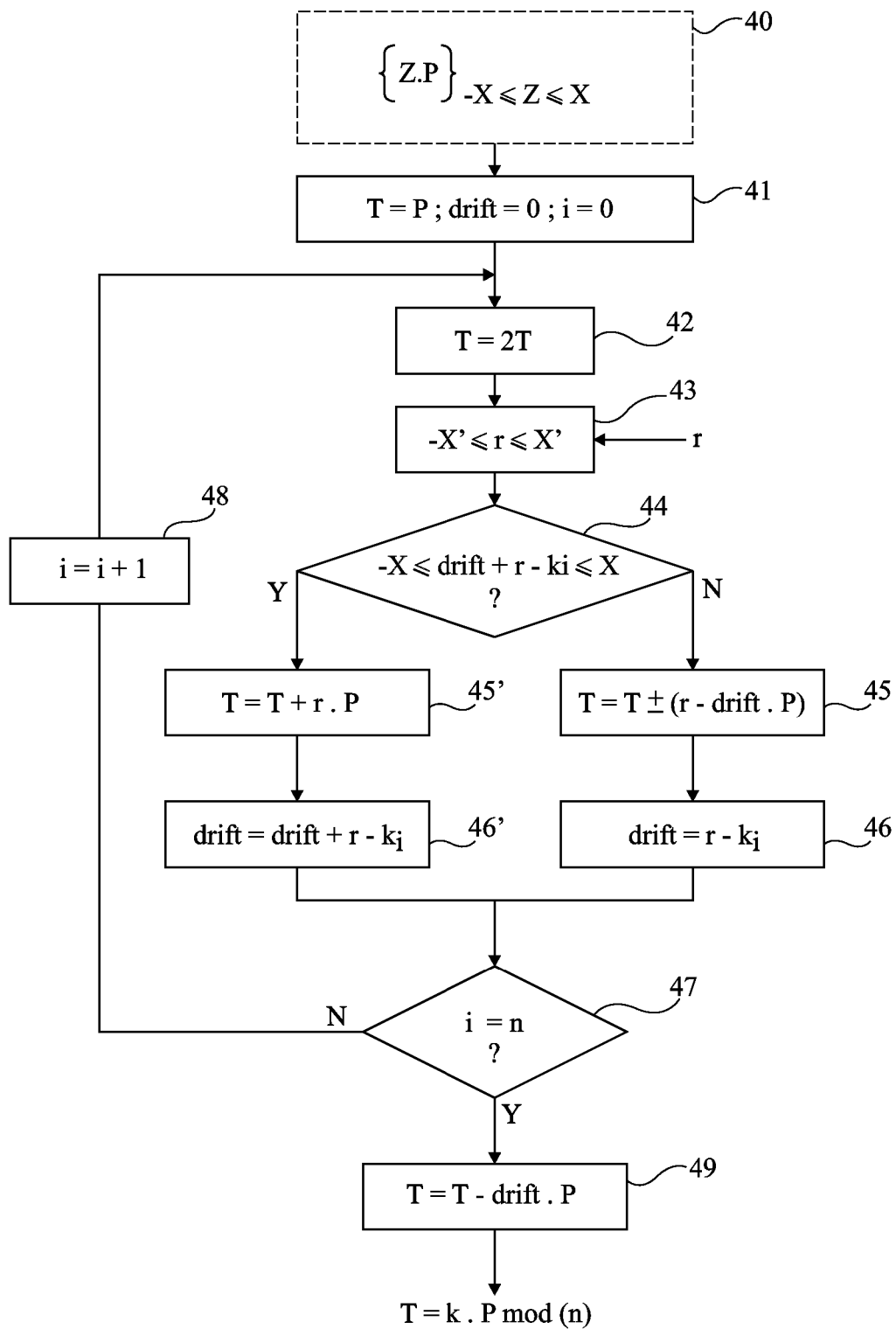
FIG. 4 schematically shows in the form of blocks an embodiment of the method for protecting a multiplication on an elliptic curve.

FIG. 4 very schematically shows in the form of blocks an embodiment applied to the multiplication of a point P of an elliptic curve by a scalar number k, by the double-and-add technique.

Different variables used in the calculation (block 41, T=P; drift=0; i=0) are initialized. For example, a variable T is intended to contain an intermediate result and is initialized with value P of the point of the elliptic curve, a drift value used to mask the calculation is set to 0. An index of current bit i is set, for example, to 0, to start the calculation from right to left (from the most significant bit to the least significant bit) but may as a variation be set to n, representing the number of bits of quantity k for a calculation from left to right. A calculation modulo n is arbitrarily assumed, but the modulo may be different from the size of quantity k.

For each bit $k_i$ of quantity k, an operation (block 42, T=2T) of doubling of the content of the variable T is performed. Then, a random number r (block 43, $-X' \leq r \leq X'$) selected to ranges between two values −X' and X' is drawn. In practice, limit X' corresponds to the number of bits over which the random number is drawn.

A test (block 44, $-X \leq drift+r-k_i \leq X$?) is then performed on the sum of the content of the drift variable, of random number r, minus the state (1 or 0) of current bit $k_i$ of number k.

If (output N of block 44) the result exceeds the authorized range (from −X to X), variable T is updated by an operation (block 45, $T=T+/-(r-drift \cdot P)$) of addition or subtraction (according to the direction in which the limit is exceeded) of quantity r−drift·P. Then, variable drift takes value $r-k_i$ (block 46, drift=$r-k_i$).

In the opposite case (output Y of block 44), variable T is updated (block 45', T=T+r·P) by being added the product of quantity r by value P. Then, quantity r−$k_i$ is added to the drift variable (block 46', drift=drift+r−$k_i$).

As a variation, the order of steps 45 and 46 (45' and 46') may be modified. In this case, variable T is updated with value T+drift·P whatever the state of bit $k_i$.

The drift variable, which takes into account a random element and the state of the current bit, is always contained in the window defined by number X. Further, the addition calculation is well protected by the random quantity.

Limit X' of the random drawing is preferably identical to limit X authorized for the drift. For the case where different limits X and X' are selected, it will be ascertained to select limit X' of the random selection smaller than limit X of the drift, to avoid too frequent an exceeding of the range of values tested at block 44.

Steps 42 to 46 are repeated as long as all the bits of value k have not been processed (test 47, i=n?). As long as there remains a bit to be processed (output N of block 47), it is proceeded to the next bit (block 48, i=i+1) and it is returned to the input of block 42. Once all the bits have been processed (output Y of block 48), there only remains to cancel the last contribution of the random number (block 49, T=T−drift·P) to obtain the final result in variable T (k·P mod(n)).

It can be seen that multiplication drift·P to be performed in order to eliminate the contribution of random number only concerns a number of small size which is at most X. Thus, it is no longer needed to select a random number r having the size of quantity k. Indeed, since the random number is introduced at the level of the bit taken into account in the calculation loops, a random number over one bit is sufficient (values 0, 1).

Preferably, a random number r over a few bits, typically between 3 and 8 bits, will be selected, which amounts to up to 256 possible values for the random number and provides a satisfactory masking security.

The process described in relation with FIG. 4 provides a masking against side-channel attacks, for example, of DPA, electromagnetic signature analysis, or other type. Further, it also provides a protection against so-called horizontal attacks (for example, of SPA type). Indeed, the number of performed operations is identical whatever the state of the bit of the secret quantity.

Preferably to spare calculation time, the different values capable of being taken by quantity drift·P (block 45) are pre-calculated. Thus, as illustrated by block 40 in FIG. 4, several products Z·P are pre-calculated for any possible value of Z ranging between—X and X. This set of pre-calculated values is then exploited by block 45 according to value drift which is necessarily within the range defined by value X. It can be seen that the number of values to be pre-calculated is relatively limited. For a calculation on an elliptic curve and a 3-bit window, values −8P to 8P are calculated. Knowing that 0·P is a point at infinity defined by convention, this results in 17 values to be stored, but only in 15 values to be calculated (P being known).

The selection of the size of the window depends on the calculation and storage capacities of the circuit.

Further, the security level becomes parameterizable in the algorithm. Indeed, value X may be defined according to the desired security level. Thus, a same encryption calculation cell may be used with different security levels according to the manipulated quantities.

Figure 5:
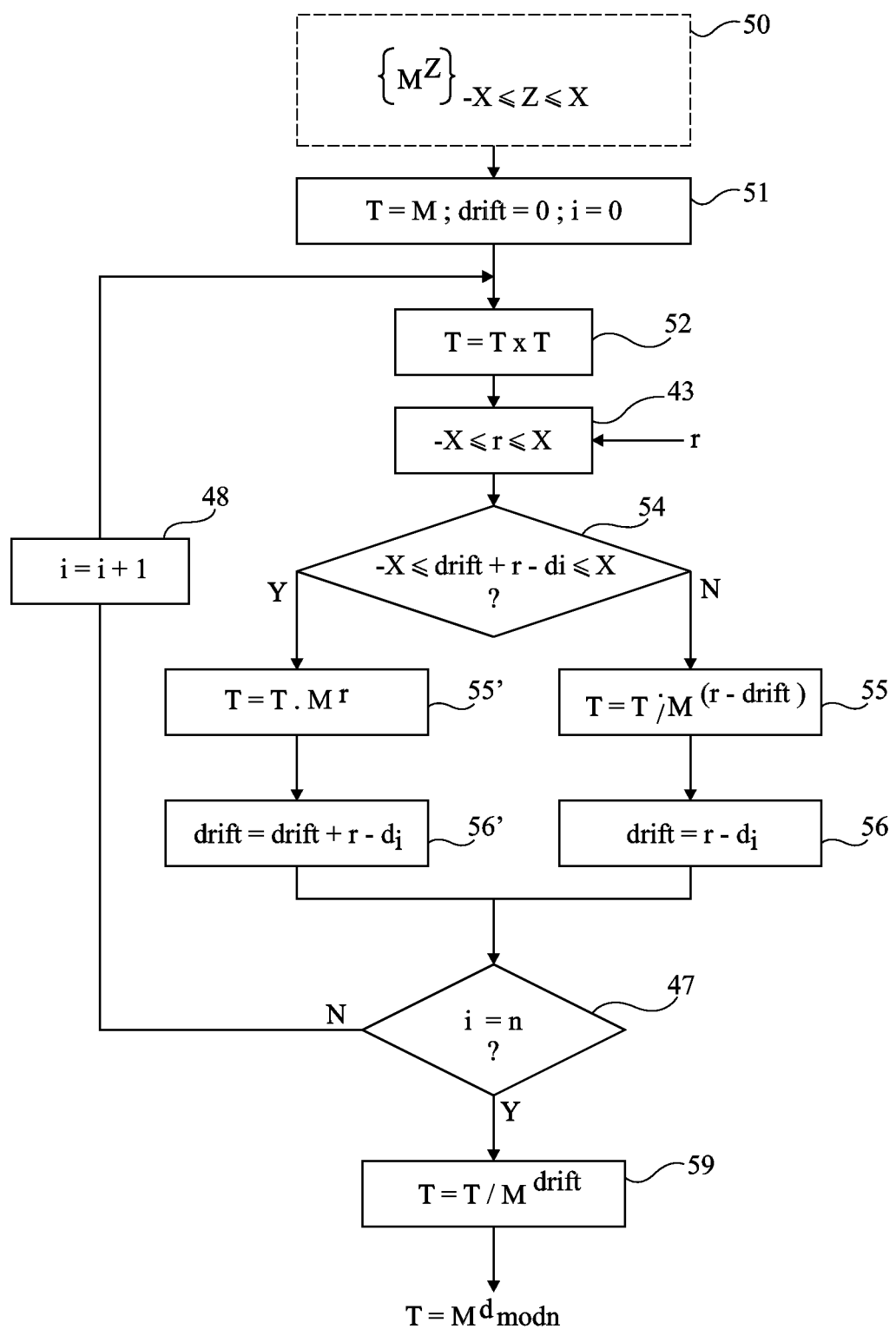
FIG. 5 schematically shows in the form of blocks an embodiment of the method for protecting a modular exponentiation.

FIG. 5 shows an embodiment applied to a modular exponentiation.

It shows most of the steps described in relation with FIG. 4 to within the following differences:

steps 50, 51, and 59, corresponding to steps 40, 41, and 49, take into account value M (modulo n) to be submitted to the modular exponentiation (for example, the message to be ciphered) instead of point P;

step 42 is replaced with a squaring step 52 (block 52, T=T·T);

steps 54, 56, and 56', corresponding to steps 44, 46, and 46', take into account the n bits $d_i$ of exponent d instead of bits $k_i$ of scalar number k;

at steps 55 (T=T·$M^{(r-drift)}$), 55' (T=T·$M^r$) and 59 (T=T/$M^{drift}$), corresponding to steps 45, 45', and 49, the product of point P is replaced with an exponentiation of value M, the addition (+) is replaced with a multiplication (·), the subtraction (−) is replaced with a division (/).

Preferably, random number r is drawn at each round (for each bit of the secret quantity). However, in a simplified embodiment (providing a lesser protection), it may be provided to use a same random number r for the entire calculation.

It can be seen that at steps 45, 46, 45', 46', 55, 56, 55', 56', the calculation differs according to the state of the bit of the secret quantity. Accordingly, the executed calculation is in accordance with a double-and-add operation on an elliptic curve or a square-and-multiply operation for the modular exponentiation.

Various embodiments have been described. Various alterations and modifications will occur to those skilled in the art. In particular, although the embodiments have been described in relation with a multiplication on an elliptic curve and a modular exponentiation, they more generally apply whatever the form of the algorithm used, provided for it to comprise an double-and-add or a square-and-multiply operation according to the bits of one of the operands. In particular, a so-called Montgomery representation may be used in the context of the modular exponentiation. Further, the practical implementation of the described embodiments is within the abilities of those skilled in the art based on the functional indications given hereabove and by using tools usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, comprising:

executing a ciphering algorithm including executing looped operations on bits of a first quantity and on a first variable initialized by a second quantity; and protecting the ciphering algorithm, the protecting including, for each bit of the first quantity, updating a second variable maintained between two thresholds, the updating including adding a random number to a state of the bit of the first quantity, wherein the second variable represents a drift introduced by the random number during executions of the looped operations, the first quantity is an encryption key and the cyphering algorithm encrypts the second quantity using the encryption key.

2. A method, comprising:

executing a ciphering algorithm including executing looped operations on bits of a first quantity and on a first variable initialized by a second quantity; and protecting the ciphering algorithm, the protecting including, for each bit of the first quantity, updating a second variable maintained between two thresholds, the updating including adding a random number to a state of the bit of the first quantity, wherein, for each bit of the first quantity, the updating of the second variable includes:
  updating the second variable to a first update value obtained by adding the random number to a value of the second variable and subtracting the state of the bit if the first update value ranges between said two thresholds; and
  updating the second variable to a second update value obtained by subtracting the state of the bit from the random number if the first update value does not range between said two thresholds.

3. The method of claim 2, wherein said second variable is used in one of plural operations performed for each bit of the first quantity.

4. A method, comprising:
  executing a ciphering algorithm including executing looped operations on bits of a first quantity and on a first variable initialized by a second quantity;
  protecting the ciphering algorithm, the protecting including, for each bit of the first quantity, updating a second variable maintained between two thresholds, the updating including adding a random number to a state of the bit of the first quantity; and
  for each bit of the first quantity, updating the first variable with:
    a result of a first calculation taking into account the second quantity and the random number if the second variable, plus the random number and minus the state of the bit of the first quantity, ranges between said two thresholds; and
    a result of a second calculation taking into account the second quantity, the random number, and said second variable if the second variable, plus the random number and minus the state of the bit of the first quantity, does not range between said two thresholds.

5. The method of claim 4, wherein each of said first and second calculations comprises a sum and a product.

6. The method of claim 4, wherein each of said first and second calculations comprises a product and an exponentiation.

7. The method of claim 1, wherein the random number is drawn for each bit of the first quantity.

8. The method of claim 1, comprising, after updating the second variable for each bit of the first quantity, updating the first variable by a calculation taking into account said second variable and the second quantity.

9. The method of claim 1, wherein the second variable includes no more than 8 bits.

10. The method of claim 3, wherein said plural operations comprise an addition and a doubling, said second variable being taken into account during the addition.

11. The method of claim 10, wherein the executing includes multiplying a point of an elliptic curve by a scalar number, said scalar number representing the first quantity and said point representing the second quantity.

12. The method of claim 3, wherein said plural operations comprise a squaring and a multiplication, said second variable being taken into account in the multiplication.

13. The method of claim 12, wherein the executing includes performing a modular exponentiation of the second quantity, the first quantity representing an exponent of the modular exponentiation of the second quantity.

14. The method of claim 2 wherein the second variable represents a drift introduced by the random number during executions of the looped operations, the first quantity is an encryption key and the cyphering algorithm encrypts the second quantity using the encryption key.

15. A device, comprising:
  one or more memories; and
  cryptographic circuitry, which, in operation:
    executes a ciphering algorithm including executing looped operations on bits of a first quantity and on a first variable initialized by a second quantity; and
    protects execution of the ciphering algorithm, the protecting including, for each bit of the first quantity, maintaining a second variable between two thresholds during an execution of a looped operation, the maintaining including combining a random number and a state of the bit of the first quantity, wherein the second variable represents a drift introduced by the random number during executions of the looped operations, the first quantity is an encryption key and the cyphering algorithm encrypts the second quantity using the encryption key.

16. A device, comprising:
  one or more memories; and
  cryptographic circuitry, which, in operation:
    executes a ciphering algorithm including executing looped operations on bits of a first quantity and on a first variable initialized by a second quantity; and
  protects execution of the ciphering algorithm, the protecting including, for each bit of the first quantity, maintaining a second variable between two thresholds during an execution of a looped operation, the maintaining including combining a random number and a state of the bit of the first quantity, wherein, for each bit of the first quantity, the maintaining of the second variable includes:
    updating the second variable to a first update value obtained by adding the random number to a value of the second variable and subtracting the state of the bit of the first quantity when the first update value ranges between said two thresholds; and
    updating the second variable to a second update value obtained by subtracting the state of the bit of the first quantity from the random number when the first update value does not range between said two thresholds.

17. The device of claim 15 wherein said second variable is used in one of plural operations performed for each bit of the first quantity.

18. A device, comprising:
  one or more memories; and
  cryptographic circuitry, which, in operation:
    executes a ciphering algorithm including executing looped operations on bits of a first quantity and on a first variable initialized by a second quantity; and
    protects execution of the ciphering algorithm, the protecting including, for each bit of the first quantity, maintaining a second variable between two thresholds during an execution of a looped operation, the maintaining including combining a random number and a state of the bit of the first quantity, wherein the protecting includes, for each bit of the first quantity, updating the first variable with:
      a result of a first calculation taking into account the second quantity and the random number when the second variable, plus the random number and minus the state of the bit of the first quantity, ranges between said two thresholds; and
      a result of a second calculation taking into account the second quantity, the random number, and said second variable when the second variable, plus the random number and minus the state of the bit of the first quantity, does not range between said two thresholds.

19. The device of claim 18 wherein each of said first and second calculations comprises a sum and a product.

20. The device of claim 18 wherein each of said first and second calculations comprises a product and an exponentiation.

21. The device of claim 17 wherein said plural operations comprise an addition and a doubling, said second variable being taken into account during the addition.

22. The device of claim 21 wherein the executing includes multiplying a point of an elliptic curve by a scalar number, said scalar number representing the first quantity and said point representing the second quantity.

23. The device of claim 17 wherein said plural operations comprise a squaring and a multiplication, said second variable being taken into account in the multiplication.

24. The device of claim 23 wherein the executing includes performing a modular exponentiation of the second quantity, the first quantity representing an exponent of the modular exponentiation of the second quantity.

25. The device of claim 16 wherein the second variable represents a drift introduced by the random number during executions of the looped operations.

26. The device of claim 25 wherein the first quantity is an encryption key and the cyphering algorithm encrypts the second quantity using the encryption key.

27. The device of claim 18 wherein the first quantity is an encryption key and the cyphering algorithm encrypts the second quantity using the encryption key.

* * * * *